United States Patent [19]
Peters

[11] Patent Number: 5,423,626
[45] Date of Patent: Jun. 13, 1995

[54] CLAMPING ASSEMBLY

[75] Inventor: Alan R. Peters, Milford, Conn.

[73] Assignee: The Fletcher-Terry Company, Farmington, Conn.

[21] Appl. No.: 174,782

[22] Filed: Dec. 29, 1993

Related U.S. Application Data

[63] Continuation-in-part of Ser. No. 35,237, Mar. 22, 1993.

[51] Int. Cl.$^6$ .................. G09F 1/10; F16B 7/00
[52] U.S. Cl. .................. 403/362; 403/403; 403/309; 40/155
[58] Field of Search .......... 40/155, 156, 159.1; 403/362, 331, 248, 405.1, 403, 309

[56] References Cited

U.S. PATENT DOCUMENTS

| | | | |
|---|---|---|---|
| 2,217,656 | 10/1940 | Boehme | 403/362 |
| 3,534,490 | 10/1970 | Herbert | 40/155 |
| 3,620,558 | 11/1971 | MacMillan | 403/362 |
| 3,965,601 | 6/1976 | Nielsen | 40/155 |
| 4,122,617 | 10/1978 | Nielsen | 40/155 |
| 4,356,650 | 11/1982 | Antonczyk et al. | 40/160 |
| 4,377,915 | 3/1983 | Zossimas et al. | 40/155 |
| 4,403,434 | 9/1983 | Jenkins | 40/152 |
| 4,490,064 | 12/1984 | Ducharme | 403/362 X |
| 4,516,341 | 5/1985 | Jenkins | 40/152 |
| 4,694,598 | 9/1987 | Eisenloeffel | 40/155 |
| 4,718,184 | 1/1988 | Sherman | 40/155 |
| 4,859,109 | 8/1989 | Targetti | 403/362 X |
| 4,896,992 | 1/1990 | Muhlethaler | 403/362 X |
| 5,015,118 | 5/1991 | Sewell et al. | 403/362 |

FOREIGN PATENT DOCUMENTS

| | | |
|---|---|---|
| 1168445 | 6/1984 | Canada. |
| 1178439 | 11/1984 | Canada. |
| 1571595 | 7/1980 | United Kingdom. |

Primary Examiner—Kenneth J. Dorner
Assistant Examiner—Cassandra Davis
Attorney, Agent, or Firm—Ira S. Dorman

[57] ABSTRACT

A clamp assembly for use in constructing a picture frame consists of two superposed, separate plates. One plate has threaded apertures for the receipt of jacking screws, and the other has recesses for engaging the tips of the screws, the axes of which are offset when the lateral edges of the plates are in mutual registry; adjacent interior edges of the plates are serrated for increased gripping power. Advancement of the screw separates and shifts the plates to move the serrated edges toward one another, thus applying lateral as well as a transverse clamping and gripping forces upon the frame members.

13 Claims, 2 Drawing Sheets

CLAMPING ASSEMBLY

CROSS REFERENCE TO RELATED APPLICATION

This application is a continuation-in-part of copending application Ser. No. 08/035,237, filed on Mar. 22, 1993.

BACKGROUND OF THE INVENTION

This invention relates to frames for pictures and the like and, more particularly, to clamp assemblies used in constructing such frames.

It is conventional to construct picture frames by use of so-called "corners" or "corner clamps." The frame pieces employed are usually formed with channels (e.g., as a metal extrusion); end portions of the corner clamps are inserted into the channels of the frame pieces that are to be joined, after which the clamps are tightened to secure the assembly.

Two-piece clamp sets are described in U.S. Pat. Nos. 3,534,490 to Herbert, 3,965,601 and 4,122,617 to Nielson, and 4,516,341 to Jenkins. The use of a single angle piece at each corner of a frame is disclosed in U.S. Pat. Nos. 4,356,650 to Antonczyk, 4,403,434 to Jenkins, and 4,718,184 to Sherman, and a laterally acting connecting member is shown in UK patent No. 1,571,595, to Ciancimino.

Eisenloeffel U.S. Pat. No. 4,694,598 and Grove Canadian patent No. 1,178,439 provide clamping devices of box-like construction. In each case a screw passes through a rearward wall of the structure and into engagement with a pair of confronting, resilient arms; the ends of the arms are so formed as to cause them to be simultaneously urged forwardly and sidewardly by the screw, thereby to exert both transverse and lateral clamping forces. Canadian patent No. 1,168,445, to Zossimas, is generally similar in the embodiment shown in FIGS. 1 through 3, except that the arms on the clamp appear to produce only lateral force.

Despite the activity in the art exemplified by the foregoing, a need has existed for a corner clamp assembly that is suitable for use in the assembly of frame pieces, which is incomplex and relatively facile and inexpensive to manufacture, is convenient to use with minimal need for adjustment or realignment after initial set-up, and is highly effective in producing simultaneously clamping forces in transverse and lateral directions.

Although the foregoing need has been satisfied by the clamp assembly, frame and method of the above-identified parent application, there are instances (such as when frame components are imprecisely cut) in which a gap tends to be present at a corner of the frame. It would of course be highly desirable to provide means for closing or at least reducing such gaps while, at the same time, increasing the force with which the components are held in assembly.

SUMMARY OF THE INVENTION

Accordingly, it is a primary object of the present invention to provide a clamp assembly for constructing a frame or the like from a plurality of pieces, which has the attributes of the assembly of the parent application (i.e., is incomplex and relatively facile and inexpensive to manufacture, is easy and convenient to use, and is highly effective in producing both lateral and transverse clamping forces to securely assemble the frame pieces), while also affording increased gripping power and serving to minimize or eliminate gaps that would otherwise be present at the corners between adjacent frame pieces.

Related objects are to provide a strong and rigid frame that is constructed from separate pieces joined in a true angular relationship to one another, and to provide a facile method for the assembly of such a frame, which method entails little if any need for adjustment or realignment of the joined pieces.

It has now been found that certain of the foregoing and related objects of the invention are attained by the provision of a clamping assembly comprised of a first plate, a separate second plate, and at least two jacking screws. Each plate has two angularly disposed leg portions, which in turn have two opposite lateral edges extending therealong. The leg portions of the "first" plate have recess formations therein located on an axis lying between the lateral edges, and all of the lateral edges lie in a common plane to which the recess formations extend substantially normal. When the "second" plate is superposed with the first, the lateral edges of each of its leg portions are disposed in substantial registry with the corresponding edges of the associated leg portion of the "first" plate, and all of the edges of the "second" plate are also disposed in a common plane. Each leg portion of the "second" plate has a threaded aperture therein, which is located on an axis lying between its edges and extends substantially normal to the plane of the plate. One of the jacking screws is threadably engaged in each of the apertures of the "second" plate. Each screw has a tip formation at one end and means for turning at the other end, and at least one of (a) the tip formations of the jacking screws, and (b) the recess formations of the first plate, are defined by a bevelled camming surface. The spatial relationships that exist between the recess formations, the apertures, and the edges of the respective leg portions cause the axis of each aperture to be offset from the axis of the recess formation of the associated leg portion when the plates are in superposed relationship and the edges are in such registry. The distance and axis of offset of one pair of recess formation and aperture axes is substantially the same as the offset distance and axis of the other pair of such axes, and the offset axis is perpendicular to the bisectors of the angles between the leg portions of the plates (which bisectors are of course mutually parallel). The spatial relationship established also causes a surface element of the other of the formations (i.e., defined under (a) and (b) above) to be so disposed as to engage the camming surface of the "one" formation with the plates in superposed relationship. As a result, upon advancement of the screws the camming surfaces effect transverse separation of the plates as well as lateral relative shifting of the plates along the axis of offset.

In the preferred embodiments, two lateral edges on each of the plates will be mutually adjacent and internally disposed. At least one internally disposed edge on each plate will have gripping means thereon, that edge on the "first" plate being on the opposite side of the bisectors from the corresponding edge on the "second" plate when the plates are in superposed relationship, and those edges moving toward one another as the plates are shifted. Most desirably, the gripping means will comprise serrations on the plate edges.

The lateral edges on each leg portion of the plates will usually be rectilinear, and mutually parallel. The tip formations on the jacking screws may be substantially conical, to provide the camming surface, with the recess formation in the "first" plate being either of uniform cross section or of conical form; in the latter case, both conical surfaces will desirably have the same angle and direction of taper (i.e., away from the "second" plate).

Other objects of the invention are attained by the provision of a frame comprised of a plurality of separate frame pieces, and a corresponding plurality of clamp assemblies, as herein described, joining adjacent end portions of the frame pieces to one another. Each clamp assembly spans the adjacent end portions of two frame pieces, with pairs of superposed leg portions clampingly engaged within channels thereof. The jacking screws extend from the "first" plate into engagement with the recess formation of the associated "second" plate, thus separating the plates and urging their outer faces against front and back wall components of the frame pieces; the screws also shift the associated plates relative to one another, along the axis of offset, urging two of at least the internal lateral edges against the confronting wall components.

Additional objects are attained by the provision of a method for constructing a frame or the like, utilizing the frame pieces and clamp assemblies described. In carrying out the method the pairs of leg portions of each clamp assembly are inserted into the channels of the frame piece end portions, after which the jacking screws are extended to separate and shift the plates, simultaneously producing the desired lateral and transverse clamping effects.

DETAILED DESCRIPTION OF THE ILLUSTRATED EMBODIMENTS

Figure 6:
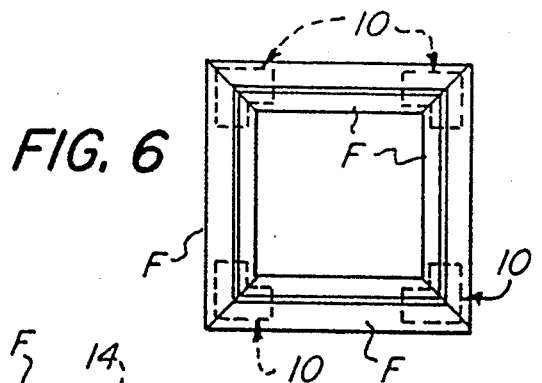
FIG. 6 is a rear elevational, diagrammatic representation of a frame embodying the present invention.
Figure 1:
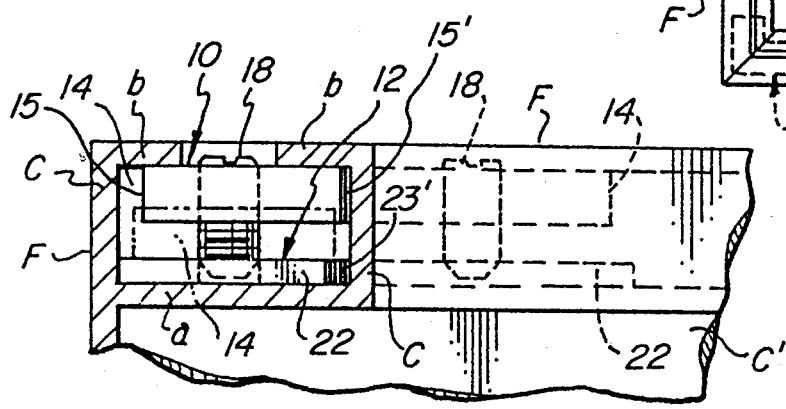
FIG. 1 is a fragmentary elevational view, taken in partial section, showing a frame embodying the present invention and showing, in full and phantom line respectively, expanded and collapsed configurations of the clamp assembly employed.

Turning now in detail to FIGS. 1 through 6 of the drawing, therein illustrated are a frame and a clamp assembly embodying the present invention. The part of the frame that is depicted in FIG. 1 consists of two channel members or pieces "F", the ends of which are mitered at 45° to produce one corner of the common rectangular frame depicted in FIG. 6. Each frame piece consists of front, back and lateral wall components "a", "b", and "c", respectively, and it will be appreciated that the frame has been simplified for clarity of illustration; i.e., features for holding the picture, a backing panel, glass, etc., have been omitted (as suggested by the broken-away extension c' from outer wall component c) as being non-essential to a full description and understanding of the invention.

The clamp assembly comprises an upper or rearward plate, generally designated by the numeral 10, and a lower or forward plate generally designated by the numeral 12. The upper plate consists of two, mutually perpendicular leg portions 14, each of which has parallel, rectilinear lateral edges 15 and a threaded aperture 16 therebetween; as can be seen, one of the interior edges 15' is serrated. A set screw 18, having a frustoconical tip formation 20 thereon, is engaged in each of the apertures 16. The lower plate 12 similarly has mutually perpendicular leg portions 22 thereon, with circular holes 24 formed between its parallel, rectilinear edges 23, 23' (the latter being a serrated interior edge).

Figure 2:
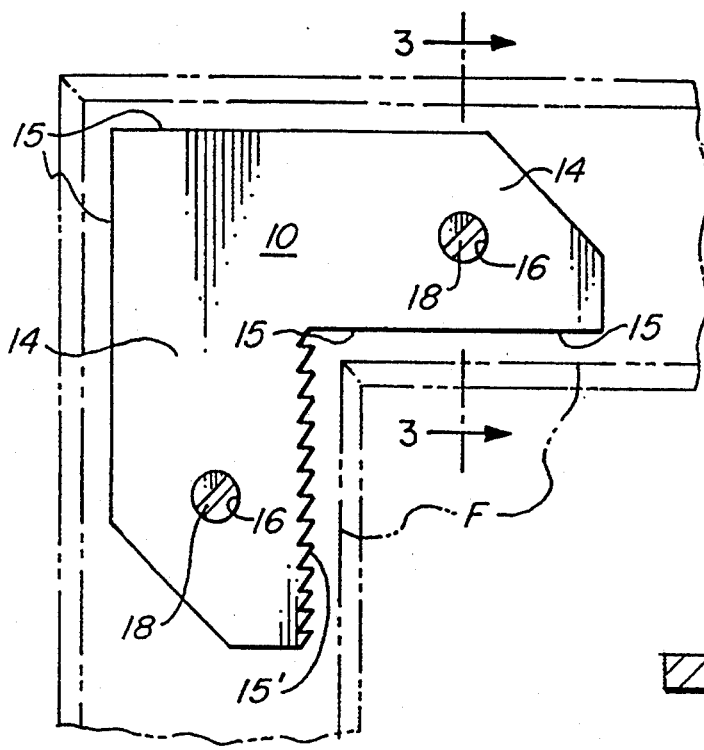
FIG. 2 is a plan view of the clamp assembly used in the frame of FIG. 1, the latter being depicted in phantom line and the assembly being shown in its collapsed configuration.
Figure 3:
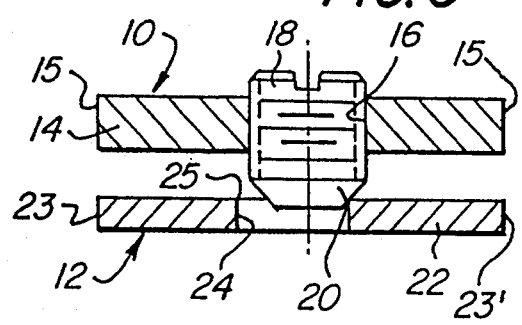
FIG. 3 is sectional view taken along line 3—3 of a FIG. 2, showing one superposed pair of leg portions of the clamp assembly of the foregoing Figures, prior to effective advancement of the jacking screw.
Figure 5:
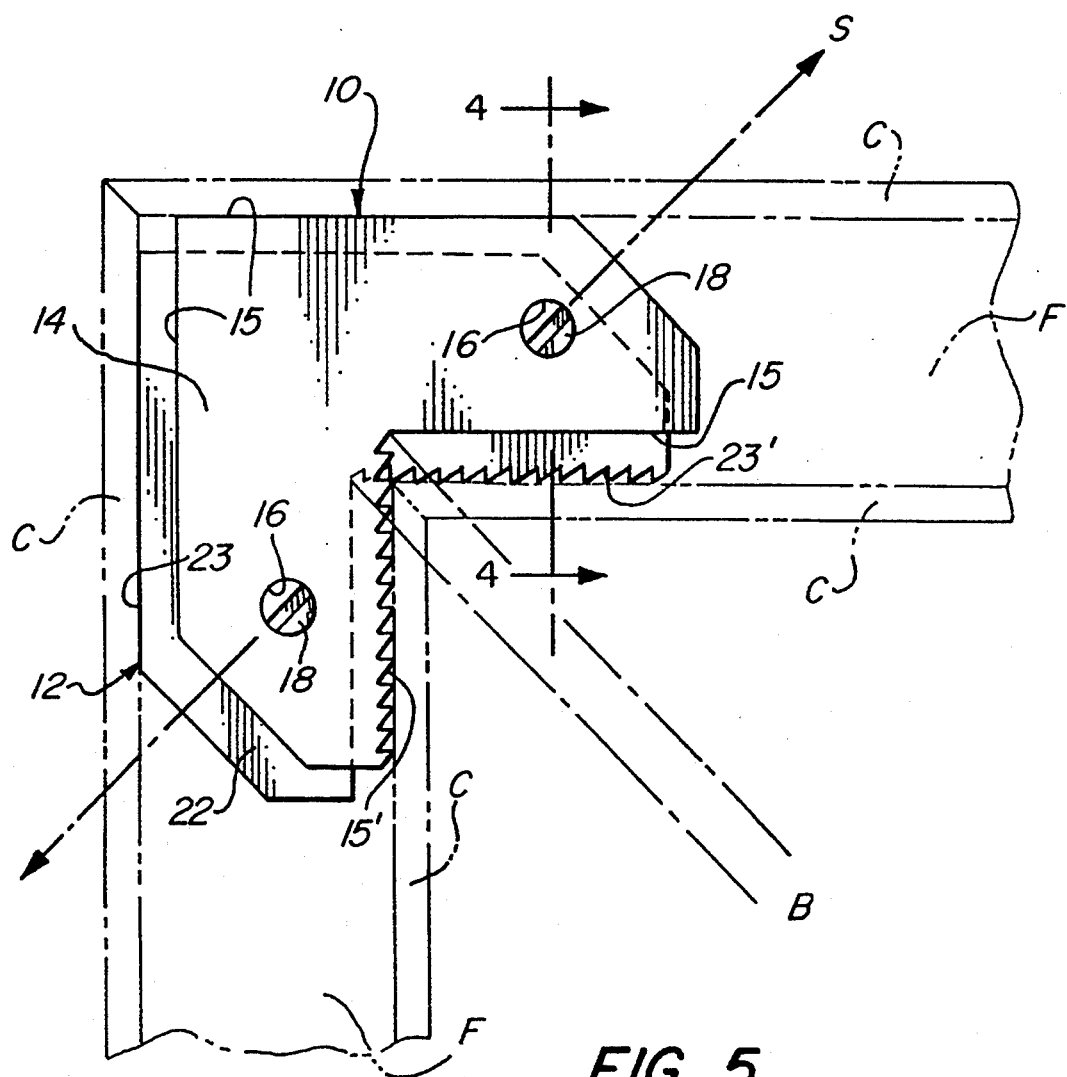
FIG. 5 is a view similar to FIG. 2, showing the assembly in its expanded configuration.

As best seen in FIGS. 2 and 3, prior to insertion into the frame members F, and prior to extension of the screws 18, the plates 10 and 12 are disposed in superposed relationship with the respective edges 15 and 23 thereof in registry with one another. It will be noted that the axis of the screw 18 is offset from that of the hole 24 in that relationship, causing the shoulder element 25 at the entrance to the hole to register between the margins of the conical tip formation 20. Consequently, advancement of the screw 18 toward and beyond engagement of the plate 12 will not only effect its separation from the plate 10 but will also effect a mutual shifting of the plates 10, 12 along the axis S (which is perpendicular to the bisectors B of the plates), ultimately to produce the relationship shown in FIGS. 1 (in full line), 4 and 5. This will of course generate clamping forces in both the transverse direction (i.e., against wall components a and b of the frame pieces F) and also the lateral direction. The serrations on the inner edges 15', 23' will increase the grip of the plates on the adjacent interior sidewall components c (the teeth of the serrations being relatively sharp, and optimally canted for that effect), not only producing greater holding power but also enabling the plates to draw the frame pieces together as the plates are shifted, thereby tending to close any gap that might otherwise form between the mitered ends.

Figure 7:
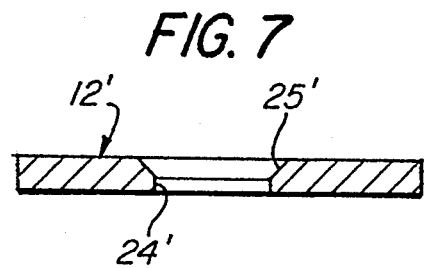
FIG. 7 is a sectional view of a plate, suitable for use in the present clamp assembly, having an alternative form of recess formation.
Figure 4:
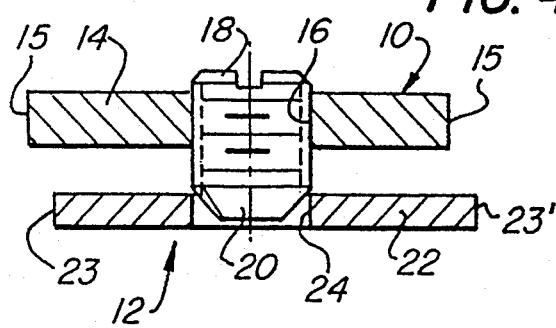
FIG. 4 a sectional view taken along line 4—4 of FIG. 5, showing the position of the plates with the jacking screw effectively advanced for clamping.

FIG. 7 shows an alternative form of a lower plate 12' that may be desirably utilized in the assembly. As can be seen, it differs from plate 12 only in that a countersink leads to the aperture 24', providing a frustoconical shoulder 25' at the entrance. The resultant surface may coact somewhat more smoothly with the conical surface on the tip of the screw 18, and may therefore be deemed preferable in certain respects.

Although right-angle plates are depicted in the drawing, it will be appreciated that clamps for constructing frames with shapes other than rectangular may be provided and would of course have their leg portions disposed at an appropriate angle other than 90°. Also, providing a single serrated edge on each plate is sufficient when the plates are restricted (e.g., by virtue of countersink shoulders, as in FIG. 7) to use in a single relationship to one another; in other cases, all four of the interior edges would normally be formed with serrations or other gripping elements. Additional modifications can be made in the instant clamp assemblies and components without departure from the novel concepts of the present invention, as will be evident to those skilled in the art.

Thus, it can be seen that the present invention provides a clamp assembly for constructing a frame or the like from a plurality of pieces, which assembly affords increased gripping power and serves to minimize or eliminate corner gaps between adjacent frame pieces. The assembly is incomplex and relatively facile and inexpensive to manufacture; it is easy and convenient to use, and is highly effective for producing both lateral and transverse clamping forces to securely assemble a multiplicity of frame pieces. The invention also provides a strong and rigid frame that is constructed from separate pieces joined in true relationships to one another, and it provides a facile assembly method in which there is little if any need for adjustment or realignment of the joined pieces.

Having thus described the invention, what is claimed is:

1. A clamp assembly for joining adjacent parts, comprising:
    a first plate having two angularly disposed leg portions, each leg portion having two opposite lateral edges extending therealong, and having a recess formation therein with an entrance located on an axis lying between said edges, all of said edges of said first plate lying in a common plane and said recess formations thereof extending on an axis substantially normal to said plane;
    a separate second plate having two angularly disposed leg portions, each leg portion having two opposite lateral edges extending therealong and disposed for substantial registry with said edges of an associated one of said leg portions of said first plate when said second plate is superposed therewith, all of said edges of said second plate lying in a common plane, and each of said leg portions thereof having a threaded aperture therein located on an axis lying between said edges and extending substantially normal to said plane of said second plate; and
    a jacking screw threadably engaged in each of said apertures of said second plate, said screw having a tip formation at one end and means for turning at the other end, at least one of (a) said tip formations of said jacking screws, and (b) said recess formations of said first plate, being defined by a bevelled camming surface; said recess formations and said apertures being disposed in such spatial relationships to said edges of said respective leg portions as to cause said axis of each of said apertures in said leg portions of said second plate to be offset from said axis of said recess formation of said associated leg portion of said first plate when said plates are in said superposed relationship with said edges in such registry, the distance and axis of offset of one pair of recess formation and aperture axes being substantially the same as the distance and axis of offset of the other pair of said recess formation and aperture axes, said axis of offset being perpendicular to the bisectors of the angles between said leg portions of said plates, said spatial relationships also causing a surface element of the other of said formations (a) and (b) to be so disposed as to engage said camming surface of said one formation in said superposed plate relationship, said camming surface producing, upon advancement of said screw, transverse separation of said plates as well as lateral relative shifting thereof along said axis of offset.

2. The assembly of claim 1 wherein two lateral edges of each of said plates are mutually adjacent and internally disposed thereon, at least one of said internally disposed edges on each of said plates having gripping means thereon, said at least one edge on said first plate being on the opposite side of said bisectors from said at least one edge on said second plate, with said plates in said superposed relationship, said spatial relationships causing said at least one edges to move toward one another upon advancement of said screws.

3. The assembly of claim 2 wherein said gripping means comprises serrations on said at least one edges.

4. The assembly of claim 1 wherein said lateral edges on said plates are all substantially rectilinear.

5. The assembly of claim 4 wherein said lateral edges on each of said leg portions of said plates are mutually parallel.

6. The assembly of claim 1 wherein said tip formation is substantially conical and provides said camming surface, said camming surface tapering in the direction away from said second plate, and wherein said recess formation is of uniform circular cross section, said surface element of said other formation being provided by a shoulder of said first plate surrounding the entrance to said recess formation.

7. The assembly of claim 1 wherein said tip formation is substantially conical and provides said camming surface, and wherein a conical surface also characterizes said recess formation, both of said surfaces having the same angle of taper and tapering in the direction away from said second plate, said surface element of said other formation comprising substantially a contact line on said recess formation surface.

8. The assembly of claim 1 wherein said recess formation is provided by an aperture in said first plate.

9. The assembly of claim 1 wherein said leg portions of each of said plates are mutually perpendicular.

10. A frame comprised of a plurality of separate frame pieces with adjacent end portions joined to one another, said end portions having front, back, and lateral wall components defining channels therein; and a corresponding plurality of said clamp assembly of claim 1 joining said frame pieces in such relationship, each said clamp assembly spanning the adjacent end portions of two frame pieces with pairs of superposed leg portions clampingly engaged within said channels thereof, said jacking screws extending from said first plates into engagement with said recess formations of the associated one of said second plates in registry therewith, separating said associated plates and urging the outer faces thereof against said front and back wall components of said frame pieces, said jacking screws also shifting said associated plates relative to one another along said axis of offset and urging two of at least the internal lateral edges thereof against confronting lateral wall components of said end portions.

11. In a method for joining adjacent parts, the steps comprising:
    providing a plurality of parts having opposite end portions with channels therein defined by front, back, and lateral wall components;
    providing a plurality of said clamp assembly of claim 1;
    inserting superposed pairs of leg portions of each said clamp assembly into said channels with said assembly spanning adjacent end portions of two parts; and extending said jacking screws from said first plate of each said assembly to engage said recesses of said second plate in registry therewith, and to separate said plates so as to urge outwardly disposed faces thereof against said front and back wall components of said parts, extension of said screws simultaneously shifting said plates relative to one another along said axis of offset so as to urge two of at least the lateral edges thereof against confronting lateral wall components of said parts.

12. A clamp assembly for joining adjacent parts comprising:

a first plate having two angularly disposed leg portions, each leg portion having two opposite lateral edges extending therealong, and having a recess formation therein with an entrance located on an axis lying between said edges, all of said edges of said first plate lying in a common plane and said recess formations thereof extending on an axis substantially normal to said plane;

a separate second plate having two angularly disposed leg portions, each leg portion having two opposite lateral edges extending therealong and disposed for substantial registry with said edges of an associated one of said leg portions of said first plate when said second plate is superposed therewith, all of said edges of said second plate lying in a common plane, and each of said leg portions thereof having a threaded aperture therein located on an axis lying between said edges and extending substantially normal to said plane of said second plate; and a jacking screw threadably engaged in each of said apertures of said second plate, said screw having a tip formation at one end and means for turning at the other end, at least one of (a) said tip formations of said jacking screws, and (b) said recess formations of said first plate, being defined by a bevelled camming surface; said recess formations and said apertures being disposed in such spatial relationships to said edges of said respective leg portions as to cause said axis of each of said apertures in said leg portions of said second plate to be offset from said axis of said recess formation of said associated leg portion of said first plate when said plates are in said superposed relationship with said edges in such registry, the distance and axis of offset of one pair of recess formation and aperture axes being substantially the same as the distance and axis of offset of the other pair of said recess formation and aperture axes, said axis of offset being perpendicular to the bisectors of the angles between said leg portions of said plates, said spatial relationships also causing a surface element of the other of said formations (a) and (b) to be so disposed as to engage said camming surface of said one formation in said superposed plate relationship, said camming surface producing, upon advancement of said screw, transverse separation of said plates as well as lateral relative shifting thereof along said axis of offset, two lateral edges on each of said plates being mutually adjacent and internally disposed, at least one of said internally disposed edges on each of said plates having gripping means thereon, said at least one edge on said first plate being on the opposite side of said bisectors from said at least one edge on said second plate, with said plates in said superposed relationship, said spatial relationships also causing said at least one edges to move toward one another upon advancement of said screws.

13. The assembly of claim 12 wherein said gripping means comprises serrations on said at least one edges.

* * * * *

UNITED STATES PATENT AND TRADEMARK OFFICE
CERTIFICATE OF CORRECTION

PATENT NO. : 5,423,626

DATED : June 13, 1995

INVENTOR(S) : ALAN R. PETERS

It is certified that error appears in the above-identified patent and that said Letters Patent is hereby corrected as shown below:

Claim 7, column 6, line 31, insert before "surfaces" the word --conical--.

Signed and Sealed this

Twenty-ninth Day of August, 1995

*Attest:*

BRUCE LEHMAN

*Attesting Officer*  Commissioner of Patents and Trademarks